(12) United States Patent
Moniz et al.

(10) Patent No.: US 10,227,879 B2
(45) Date of Patent: Mar. 12, 2019

(54) CENTRIFUGAL COMPRESSOR ASSEMBLY FOR USE IN A TURBINE ENGINE AND METHOD OF ASSEMBLY

(71) Applicant: General Electric Company, Schnectady, NY (US)

(72) Inventors: Thomas Ory Moniz, Loveland, OH (US); Joseph George Rose, Mason, OH (US)

(73) Assignee: General Electric Company, schenectady, NY (US)

( * ) Notice: Subject to any disclaimer, the term of this patent is extended or adjusted under 35 U.S.C. 154(b) by 421 days.

(21) Appl. No.: 15/041,467

(22) Filed: Feb. 11, 2016

(65) Prior Publication Data

US 2017/0234147 A1    Aug. 17, 2017

(51) Int. Cl.
*F01D 5/22*    (2006.01)
*F01D 11/08*    (2006.01)
(Continued)

(52) U.S. Cl.
CPC .............. *F01D 5/225* (2013.01); *F01D 1/06* (2013.01); *F01D 5/04* (2013.01); *F01D 5/048* (2013.01); *F01D 11/001* (2013.01); *F01D 11/08* (2013.01); *F01D 25/24* (2013.01); *F04D 29/162* (2013.01); *F04D 29/284* (2013.01); *F04D 29/4206* (2013.01); *F16J 15/164* (2013.01); *F16J 15/443* (2013.01); *F05D 2220/32* (2013.01); *F05D 2230/50* (2013.01)

(58) Field of Classification Search
CPC ...... F16J 15/164; F16J 15/443; F04D 29/162; F04D 29/284; F04D 29/4206; F01D 1/06; F01D 5/04; F01D 5/048; F01D 5/225; F01D 11/001; F01D 11/08; F01D 25/24; F05D 2220/32; F05D 2230/50
See application file for complete search history.

(56) References Cited

U.S. PATENT DOCUMENTS 5,277,541 A    1/1994    Palmer
7,189,059 B2    3/2007    Barton et al.
(Continued)

FOREIGN PATENT DOCUMENTS

EP    2 402 112 A2    1/2012
EP    2 615 338 A1    7/2013
(Continued)

OTHER PUBLICATIONS

Extended European Search Report and Opinion issued in connection with corresponding EP Application No. 17154719.3 dated Jun. 20, 2017.
(Continued)

*Primary Examiner* — Igor Kershteyn
(74) *Attorney, Agent, or Firm* — General Electric Company; Pamela Kachur

(57) ABSTRACT

A fluid transfer assembly for use in a gas turbine engine includes a rotor shaft, a stationary assembly circumscribing the rotor shaft, and a rotating component coupled to the rotor shaft and positioned radially inward of the stationary assembly. The rotating assembly includes a hub coupled to the rotor shaft, a plurality of rotor blades coupled to the hub, and a shroud coupled to the plurality of rotor blades.

18 Claims, 5 Drawing Sheets

(51) Int. Cl.
*F01D 25/24* (2006.01)
*F01D 5/04* (2006.01)
*F04D 29/16* (2006.01)
*F04D 29/28* (2006.01)
*F04D 29/42* (2006.01)
*F01D 1/06* (2006.01)
*F01D 11/00* (2006.01)
*F16J 15/16* (2006.01)
*F16J 15/44* (2006.01)

(56) References Cited

U.S. PATENT DOCUMENTS

| | | | |
|---|---|---|---|
| 7,413,001 B2 | 8/2008 | Wang et al. | |
| 7,775,763 B1 | 8/2010 | Johnson et al. | |
| 8,426,766 B2 | 4/2013 | Tsukamoto et al. | |
| 8,777,561 B2 | 7/2014 | Beers et al. | |
| 2011/0318183 A1* | 12/2011 | Noronha | B23P 15/006 416/189 |
| 2013/0164119 A1* | 6/2013 | Nakaniwa | F04D 29/162 415/173.1 |
| 2014/0154078 A1* | 6/2014 | Ahn | F01D 11/00 416/174 |
| 2014/0169971 A1 | 6/2014 | Vedula et al. | |
| 2014/0308132 A1* | 10/2014 | Kim | F04D 29/284 416/179 |
| 2015/0275916 A1 | 10/2015 | Marshall et al. | |

FOREIGN PATENT DOCUMENTS

| | | |
|---|---|---|
| JP | S60-98196 A | 6/1985 |
| JP | S62-45999 A | 2/1987 |
| JP | 2004-353607 A | 12/2004 |
| JP | 2006-183475 A | 7/2006 |

OTHER PUBLICATIONS

Machine translation and First Office Action and Search issued in connection with corresponding CN Application No. 201710076075.1 dated Jul. 4, 2018.

* cited by examiner

CENTRIFUGAL COMPRESSOR ASSEMBLY FOR USE IN A TURBINE ENGINE AND METHOD OF ASSEMBLY

BACKGROUND

The present disclosure relates generally to turbine engines and, more specifically, to systems and methods of controlling rotor blade clearance in a centrifugal compressor of a turbine engine.

Known turbine engines experience several different phases of operation including, but not limited to, start-up, warm-up, steady-state, shutdown, and cool-down. At least some known turbine engines include rotating compressors and turbines that define clearances between rotor blades and inner surfaces of the surrounding seal members. These clearances are controlled to facilitate improving operating efficiency. Such clearances generally vary as the turbine or compressor transitions from one operational phase to another. More particularly, each operational phase has different operating conditions associated with it, such as temperature, pressure, and rotational speed, which will induce changes in the clearances between components, including static and moving components within the turbine engine.

In at least some known turbine engines, the clearances between compressor and/or turbine rotor blades and the seal members are also controlled to prevent contact-related damage therebetween as the turbine and compressor transitions between operational phases. For example, in at least some known turbine engines, cold, or assembly, clearances are set to be no larger than required for steady-state operation to account for thermal and mechanical differences in the turbine engine when transitioning between phases of operation. Moreover, as described above, turbine engine efficiency depends at least in part on the clearance between tips of the rotating blades and seal members coupled to the surrounding stationary components. If the clearance is too large, enhanced gas flow may unnecessarily leak through the clearance gaps, thus decreasing the turbine engine's efficiency. Many known turbines and compressors include variable clearance mechanisms in the high-pressure turbine section, the low-pressure turbine section, and the compressor section. However, it is generally difficult to implement clearance control systems that are integrally formed with the turbine and compressor due to the complex geometry of the components and manufacturing limitations.

BRIEF DESCRIPTION

In one aspect, a fluid transfer assembly for use in a gas turbine engine is provided. The fluid transfer assembly includes a rotor shaft, a stationary assembly circumscribing the rotor shaft, and a rotating component coupled to the rotor shaft and positioned radially inward of the stationary assembly. The rotating assembly includes a hub coupled to the rotor shaft, a plurality of rotor blades coupled to the hub, and a shroud coupled to the plurality of rotor blades.

In another aspect, a centrifugal compressor for use in a gas turbine engine including a rotor shaft is provided. The centrifugal compressor includes a hub coupled to the rotor shaft, a plurality of rotor blades coupled to the hub, wherein the plurality of rotor blades include an outer edge, and a shroud coupled to the outer edge of the plurality of rotor blades such that a flowpath is formed between the shroud and the hub.

In yet another aspect, a method of manufacturing a centrifugal compressor for use in a gas turbine engine is provided. The method includes integrally forming a plurality of blades with a hub, wherein the hub is configured to be coupled to a rotor shaft. The method also includes integrally forming a shroud with an outer edge of the plurality of rotor blades to form a flowpath defined between the shroud and the hub.

DRAWINGS

These and other features, aspects, and advantages of the present disclosure will become better understood when the following detailed description is read with reference to the accompanying drawings in which like characters represent like parts throughout the drawings, wherein.

Figure 1:
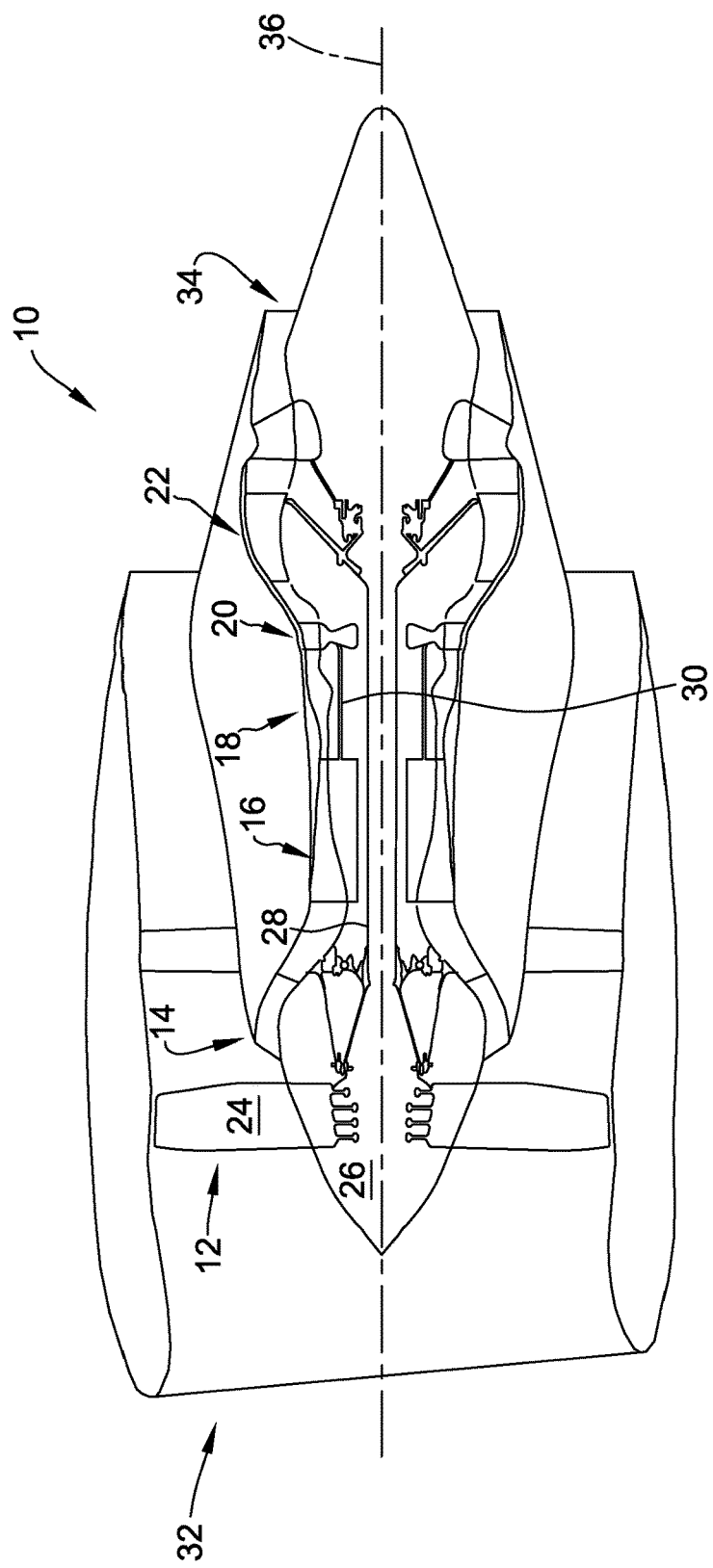
FIG. 1 is a schematic illustration of an exemplary turbofan engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to systems and methods for use in controlling rotor blade clearance in a turbine engine. More specifically, the systems described herein include a centrifugal compressor including a hub, a plurality of rotor blades coupled to the hub, and a shroud coupled to the plurality of rotor blades. The shroud is designed to accommodate the complex geometry of rotor blades in the centrifugal compressor. More specifically, the shroud is integrally formed with the rotor blades and with the hub such that there is no clearance gap between the radially outer edges of the rotor blades and the shroud. As such, the hub, rotor blades, and shroud define a plurality of sealed flowpaths along the rotor blades such that an entirety of the fluid entering the centrifugal compressor is processed or transferred and there is no fluid leakage around the rotor blades. Accordingly, the overall performance and efficiency of the turbine engine is increased.

FIG. 1 is a schematic illustration of an exemplary turbofan engine 10 including a fan assembly 12, a low pressure or booster compressor 14, a high-pressure compressor 16, and a combustor assembly 18. In one embodiment, high-pressure compressor 16 is embodied as a centrifugal compressor assembly. Fan assembly 12, booster compressor 14, high-pressure compressor 16, and combustor assembly 18 are coupled in flow communication. Turbofan engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor 14 through a first drive shaft 28, and high-pressure turbine 20 is coupled to high-pressure compressor 16 through a second drive shaft 30. Turbofan engine 10 has an intake 32 and an exhaust 34. Turbofan engine 10 further includes a centerline 36 about which fan assembly 12, booster compressor 14, high-pressure compressor 16, and turbines 20 and 22 rotate.

In operation, air entering turbofan engine 10 through intake 32 is channeled through fan assembly 12 towards booster compressor 14. Compressed air is discharged from booster compressor 14 towards high-pressure compressor 16. Highly compressed air is channeled from high-pressure compressor 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbofan engine 10 via exhaust 34.

Figure 2:
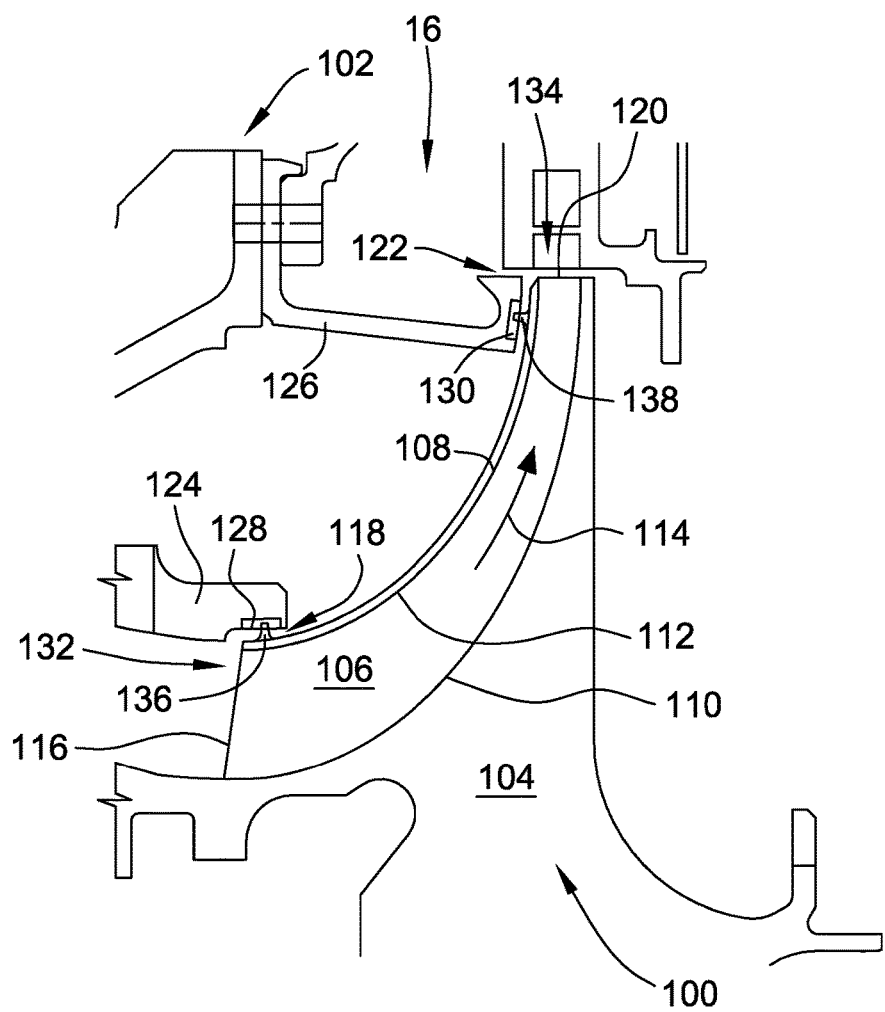
FIG. 2 is a cross-sectional illustration of a high-pressure compressor that may be used in the turbofan engine shown in FIG. 1, in accordance with a first embodiment of the disclosure.
Figure 3:
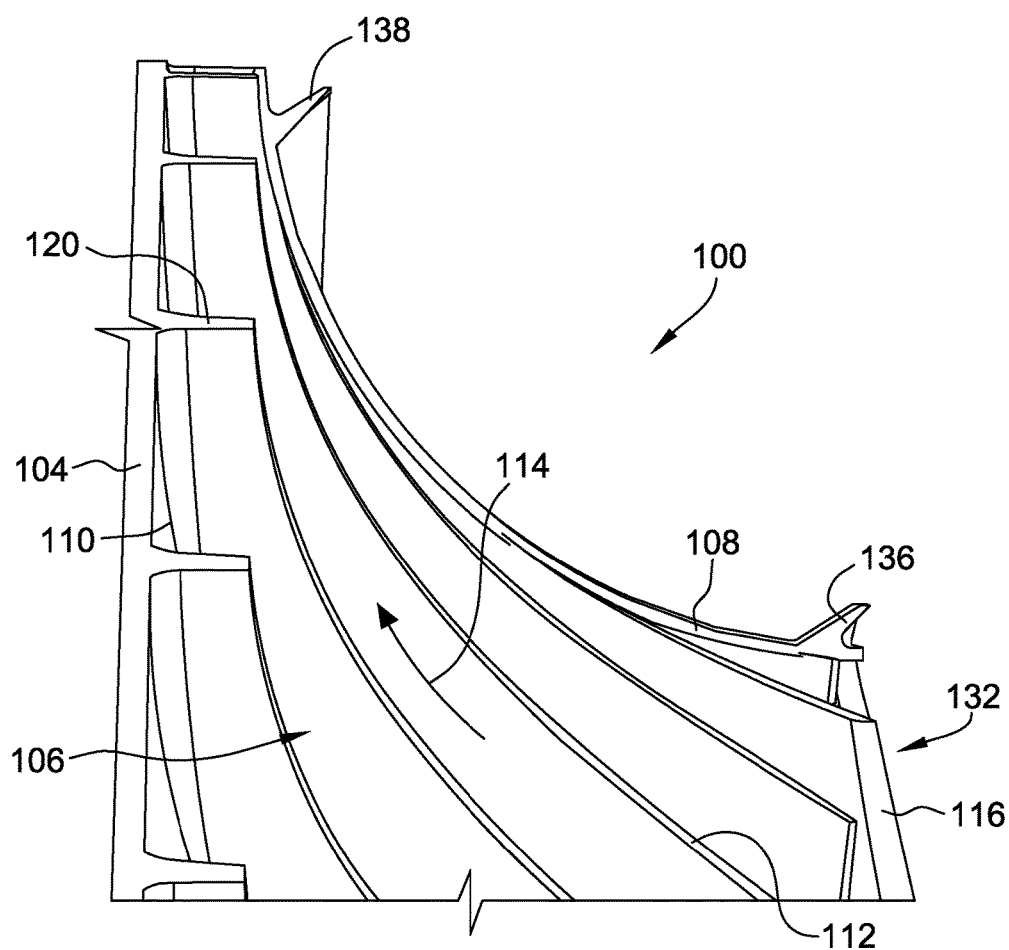
FIG. 3 is a partial cross-sectional illustration of the high-pressure compressor with the turbofan engine removed for clarity.
Figure 4:
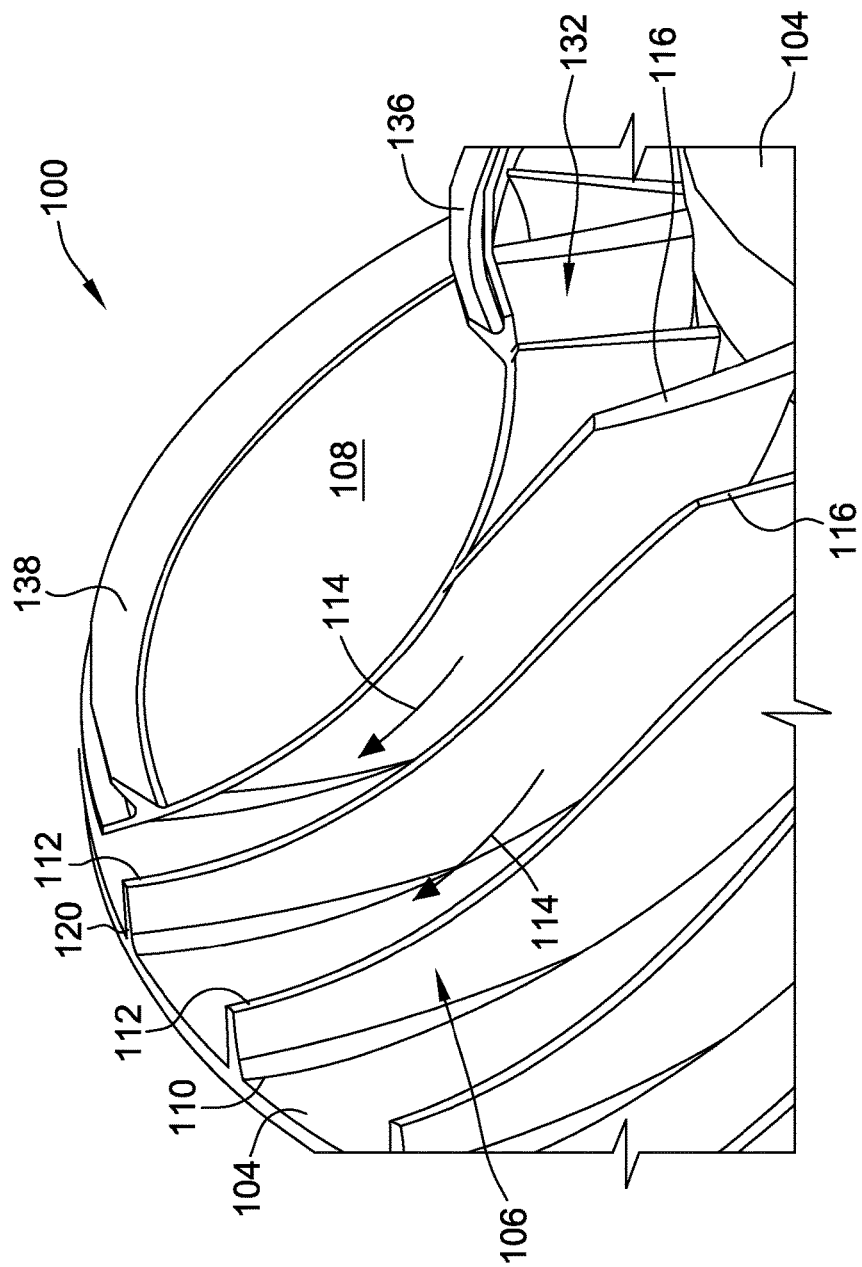
FIG. 4 is a perspective partial cross-sectional illustration of the high-pressure compressor shown in FIG. 3.

FIG. 2 is a cross-sectional illustration of a high-pressure compressor section 16 having a centrifugal compressor 100 that may be used in turbofan engine 10 (shown in FIG. 1), in accordance with a first embodiment of the disclosure. In the exemplary embodiment, high-pressure compressor section 16 includes a centrifugal compressor 100 coupled to shaft 30 and a stationary assembly 102 circumscribing centrifugal compressor 100. Although FIG. 2 illustrates and describes a compressor section 16 having a centrifugal compressor 100, this is for example only. Alternatively, the centrifugal compressor shown in FIG. 2 is a centrifugal turbine for use in high pressure turbine section 20 of turbine engine 10. Generally, FIG. 2 illustrates any fluid transfer assembly of gas turbine engine 10. FIG. 3 is a partial cross-sectional illustration of centrifugal compressor 100 with stationary assembly 102 removed for clarity; and FIG. 4 is a perspective partial cross-sectional illustration of centrifugal compressor 100 shown in FIG. 3.

Centrifugal compressor 100 includes a hub 104, a plurality of rotor blades 106 coupled to hub 104, and a shroud 108 coupled to the plurality of rotor blades 106. Rotor blades 106 can be a combination of full and partial (splitter) blades or two tandem rows of blades with moderate-to-high pressure ratio stages. In the exemplary embodiment, rotor blades 106 include a blade inner edge 110 coupled to hub 104 and a blade outer edge 112 coupled to shroud 108 such that there is no gap or clearance between blade outer edges 112 and shroud 108. Furthermore, shroud 108 extends circumferentially relative to plurality of rotor blades 106 to form a disk shape and includes an arcuate shape that is complementary to the outer profile of blade outer edges 112. As such, centrifugal compressor 100 defines a plurality fluid flowpaths 114 between shroud 108 and hub 104 between adjacent rotor blades 106.

Rotor blades 106 further include a leading edge 116 on a radially inner portion 118 of rotating component 100 and a trailing edge 120 located at a radially outer portion 122 of centrifugal compressor 100. An arcuate rotor blade length is defined between leading edge 116 and trailing edge 120. In the exemplary embodiment, shroud 108 substantially a full distance along rotor blades 106 between leading edge 116 and trailing edge 120 such that shroud 108 includes a shroud length substantially equal to the rotor blade length. Alternatively, as described in further detail below, shroud 108 extends from at least one of leading edge 116 and trailing edge 120 a distance along rotor blades 106 less than a full length of rotor blades 106.

In the exemplary embodiment, stationary assembly 102 includes a first stationary member 124 positioned adjacent radially inner portion 118 of centrifugal compressor 100 and a second stationary member 126 positioned adjacent radially outer portion 122 of centrifugal compressor 100. First stationary member 124 includes a first sealing element 128 positioned proximate leading edge 116 of rotor blades 106. Similarly, second stationary member 126 includes a second sealing element 130 positioned proximate trailing edge 120 of rotor blades 106. Sealing elements 128 and 130 form a seal with centrifugal compressor 100 such that an entirety of a fluid entering centrifugal compressor 100 through an inlet 132 thereof flows along flowpath 114 and is discharged from centrifugal compressor 100 through an outlet 134 thereof. More specifically, in the exemplary embodiment, centrifugal compressor 100 includes a first tooth 136 and a second tooth 138 coupled to shroud 108 that contact sealing elements 128 and 130, respectively, to form a seal.

Centrifugal compressor 100 is formed from a titanium-based alloy or a nickel-based alloy as single-piece component using additive manufacturing or electrical discharge machining. The material and manufacturing method are based on the size of centrifugal compressor 100 and the temperatures to which centrifugal compressor 100 is exposed in operation. Alternatively, centrifugal compressor 100 is formed from any material and by any method that facilitates operation of centrifugal compressor 100 as described herein.

In the exemplary embodiment, centrifugal compressor 100 is formed as a unitary, monolithic component such that plurality of rotor blades 106 are integrally formed with hub 104 and shroud 108 is integrally formed with plurality of rotor blades 106. Alternatively, shroud 108 is coupled to outer edges 112 of rotor blades 106 by any other means, such as by welding. Generally, centrifugal compressor 100 is formed by any means that couples shroud 108 to rotor blades 106 such that there is no gap or clearance therebetween and that shroud 108, rotor blades 106, and hub 104 define a plurality of flowpaths 114 that are enclosed with the exception of inlet 132 and outlet 134.

Figure 5:
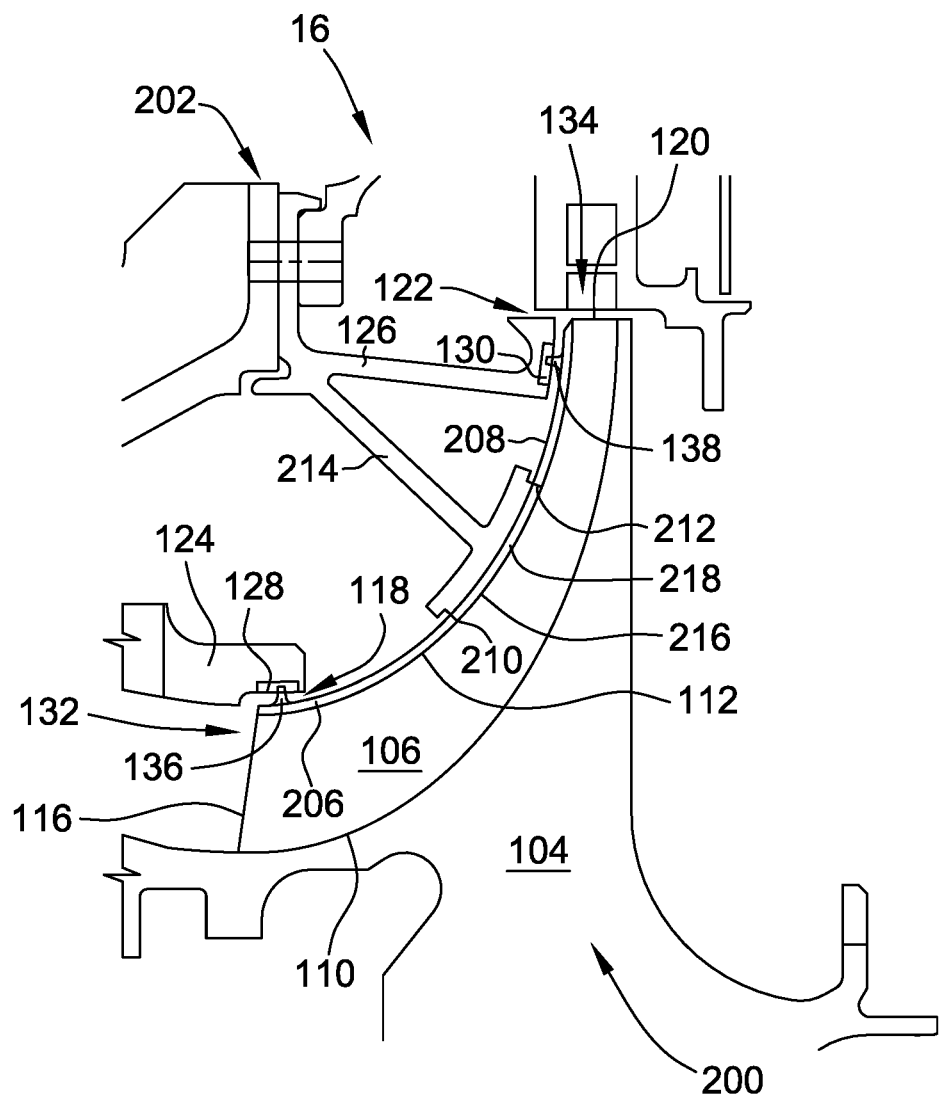
FIG. 5 is a cross-sectional illustration of a high-pressure compressor that may be used in the turbofan engine shown in FIG. 1, in accordance with a second embodiment of the disclosure.

FIG. 5 is a cross-sectional illustration of a high-pressure compressor section 16 that may be used in gas turbine engine 10 (shown in FIG. 1) including an alternative centrifugal compressor 200 and stationary assembly 202. However, centrifugal compressor 200 and stationary assembly 202 are similar to centrifugal compressor 100 and stationary assembly 102 as shown in FIGS. 2-4, and like components of centrifugal compressors 100 and 200 and stationary assemblies 102 and 202 are numbered the same.

Centrifugal compressor 200 includes hub 104, plurality of rotor blades 106 coupled to hub 104, and a first shroud 206, and a second shroud 208. Shrouds 206 and 208 are coupled to the plurality of rotor blades 106, similar to shroud 108. Rotor blades 106 include blade inner edge 110 coupled to hub 104 and blade outer edge 112 coupled to shrouds 206 and 208 such that there is no gap or clearance between blade outer edges 112 and shrouds 206 and 208. Furthermore, shrouds 206 and 208 extends circumferentially relative to plurality of rotor blades 106 to form a disk shape and includes an arcuate shape that is complementary to the outer profile of blade outer edges 112. As such, centrifugal compressor 200 defines a plurality fluid flowpaths 114 between shrouds 206 and 208 and hub 104 between adjacent rotor blades 106.

Rotor blades 106 further include leading edge 116 and trailing edge 120 that define the arcuate rotor blade length therebetween. In this embodiment, first shroud 206 extends from leading edge 116 to a shroud end 210 between leading edge 116 and trailing edge 120. Similarly, second shroud 208 extends from trailing edge 120 to a shroud end 212 between trailing edge 120 and leading edge 116. As such, each shroud 206 and 208 defines a shroud length between leading edge 116 and shroud end 210 and between trailing edge 120 and shroud end 212, respectively, which is less than the length of rotor blades 106 to which shrouds 206 and 208 are coupled. Although centrifugal compressor 200 in FIG. 5 is shown and described as having two separate shrouds 206 and 208, it is contemplated that centrifugal compressor 200 includes only one of shrouds 206 and 208. Furthermore, the locations of shroud ends 210 and 212 are shown for example only and it is contemplated that ends 210 and 212 are located at any position along rotor blade outer edge 112 between leading edge 116 and trailing edge 120. Additionally, although centrifugal compressor 200 includes shrouds 206 and 208 that extend from one of leading edge 116 or trailing edge 120, it is contemplated that shrouds 206 and 208 extend along any portion of rotor blade outer edge 112.

In this exemplary embodiment, stationary assembly 202 includes first stationary member 124, second stationary member 126, and a third stationary member 214 positioned adjacent a radially intermediate portion 216 of centrifugal compressor 200. First stationary member 124 includes first sealing element 128 positioned proximate leading edge 116 of rotor blades 106. Similarly, second stationary member 120 includes a second sealing element 130 positioned proximate trailing edge 120 of rotor blades 106. Sealing elements 128 and 130 form a seal with centrifugal compressor 200 such that an entirety of a fluid entering centrifugal compressor 200 through an inlet 132 thereof flows along flowpath 114 and is discharged from centrifugal compressor 200 through an outlet 134 thereof. More specifically, in the exemplary embodiment, centrifugal compressor 200 includes a first tooth 136 and a second tooth 138 coupled to shrouds 206 and 208, respectively, that contact sealing elements 128 and 130, respectively, to form a seal.

Third stationary member 214 includes a sealing member 218 positioned adjacent radially outer edge 112 of rotor blades 106. More specifically, sealing member 218 is spaced from radially outer edge 112 to define a clearance gap therebetween. Sealing member 218 extends along radially outer edge 112 between shroud ends 210 and 212 to seal flowpath 114 along rotor blades 106. Generally, sealing member 218 is positioned adjacent shroud 206 and/or 208 and extends away from that shroud end 210 or 212 toward leading edge 116 or trailing edge 120 until sealing member 218 reaches leading edge 116 or trailing edge 120, or the other shroud 206 or 208. That is, sealing member 218 extends along whatever portion of radially outer blade edge 112 not coupled to a shroud 206 or 208.

As described above, at least some known turbine engines include a rotating component having a plurality of rotor blades circumscribed by a stationary component with seal members positioned proximate, but spaced from, the rotor blades to define a gap or clearance therebetween extending a full length of the rotor blades. The clearance gap allows for growth of the rotating component due to thermal expansion and other deflections due to transient maneuver loads while avoiding contact between the rotating component and the stationary component. Turbine engine efficiency depends at least in part on the size of the clearance between tips of the rotating blades and the seal members coupled to the surrounding stationary components. If the clearance is too large, enhanced gas flow may unnecessarily leak through the clearance gaps, thus decreasing the turbine engine's efficiency. Integrally forming a sealing element, such as shrouds 108, 206, and 208, with at least portions of rotating blades 106 eliminates the clearance gap therebetween and negates the undesirable effects of the clearance gap on the turbine engine efficiency that result in performance loss. By integrally forming shrouds 108, 206, and 208 with rotor blades 106, the entire amount of fluid entering centrifugal compressors 100 and 200 through inlet 132 is processed by compressors 100 and 200 and exhausted through outlet 134, thus improving the efficiency of gas turbine engine 10.

An exemplary technical effect of the system and methods described herein includes at least one of: (a) improving compressor performance; and (b) improving gas turbine engine efficiency.

Exemplary embodiments of a gas turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only gas turbine engines and related methods as described herein. Rather, the exemplary embodiment can be implemented and utilized in connection with many applications where improving gas turbine efficiency is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fluid transfer assembly for use in a gas turbine engine, said fluid transfer assembly comprising:
   a rotor shaft;
   a stationary assembly circumscribing said rotor shaft; and
   a rotating component coupled to said rotor shaft and positioned radially inward of said stationary assembly, said rotating assembly comprising:
      a hub coupled to said rotor shaft;
      a plurality of rotor blades coupled to said hub; and
      a shroud coupled to said plurality of rotor blades, wherein the hub, the plurality of rotor blades, and the shroud are together integrally formed as a unitary, monolithic component.

2. The assembly in accordance with claim 1, wherein said shroud extends circumferentially relative to said plurality of rotor blades to form a disk shape.

3. The assembly in accordance with claim 1, wherein said shroud comprises arcuate shape that is complementary to an outer profile of said plurality of rotor blades.

4. The assembly in accordance with claim 1, wherein each rotor blade of said plurality of rotor blades comprises a leading edge and an opposing trailing edge that defines a rotor blade length therebetween, wherein said shroud extends substantially a full distance of the rotor blade length.

5. The assembly in accordance with claim 1, wherein each rotor blade of said plurality of rotor blades comprises a leading edge and an opposing trailing edge that defines a rotor blade length therebetween, wherein said shroud extends from at least one of said leading edge and said trailing edge to a shroud end a distance less than the length of said rotor blade.

6. The assembly in accordance with claim 5, wherein said stationary assembly comprises a sealing member positioned adjacent said plurality of rotor blades, wherein said sealing member extends away from said shroud between said shroud end and one of said leading edge or said trailing edge.

7. The assembly in accordance with claim 1, wherein said stationary assembly comprises at least one sealing element positioned proximate at least one of said leading edge and said trailing edge.

8. The assembly in accordance with claim 7, wherein said rotating component comprises at least one tooth coupled to said shroud, said at least one tooth configured to form a seal with said at least one sealing element.

9. The assembly in accordance with claim 1, wherein said rotating component comprises at least one of a centrifugal compressor and a centrifugal turbine.

10. A centrifugal compressor for use in a gas turbine engine including a rotor shaft, said centrifugal compressor comprising:
    a hub coupled to the rotor shaft;
    a plurality of rotor blades coupled to said hub, said plurality of rotor blades comprising an outer edge; and
    a shroud coupled to said outer edge of said plurality of rotor blades such that a flowpath is formed between said shroud and said hub, wherein the hub, the plurality of rotor blades, and the shroud are together integrally formed as a unitary, monolithic component.

11. The centrifugal compressor in accordance with claim 10, wherein said shroud extends circumferentially relative to said plurality of rotor blades to form a disk shape.

12. The centrifugal compressor in accordance with claim 10, said shroud comprises arcuate shape that is complementary to an outer profile of said plurality of rotor blades.

13. The centrifugal compressor in accordance with claim 10, wherein each rotor blade of said plurality of rotor blades comprises a leading edge and an opposing trailing edge that defines a rotor blade length therebetween, wherein said shroud extends substantially a full distance of the rotor blade length.

14. The centrifugal compressor in accordance with claim 10, wherein each rotor blade of said plurality of rotor blades comprises a leading edge and an opposing trailing edge that defines a rotor blade length therebetween, wherein said shroud extends from at least one of said leading edge and said trailing edge to a shroud end a distance less than the length of said rotor blade.

15. The centrifugal compressor in accordance with claim 10 further comprising at least one seal tooth coupled to said shroud, said at least one tooth configured to form a seal with a stationary assembly positioned proximate said shroud in the gas turbine engine.

16. A method of manufacturing a centrifugal compressor for use in a gas turbine engine, said method comprising:
    integrally forming a plurality of blades with a hub, the hub configured to be coupled to a rotor shaft; and
    integrally forming a shroud with an outer edge of the plurality of rotor blades to form a flowpath defined between the shroud and the hub, wherein the hub, the plurality of rotor blades, and the shroud are together integrally formed as a unitary, monolithic component.

17. The method in accordance with claim 16, wherein integrally forming the shroud comprises integrally forming the shroud such that the shroud extends substantially a full distance of the plurality of rotor blades.

18. The method in accordance with claim 16, wherein integrally forming the shroud comprises integrally forming the shroud such that the shroud extends a distance along the plurality of rotor blades less than a full length of the rotor blades.

* * * * *